(12) United States Patent
    Dieterle

(10) Patent No.: US 10,301,784 B2
(45) Date of Patent: May 28, 2019

(54) BRIDGE CAP AND FASTENING UNIT FOR FASTENING A BRIDGE CAP

(71) Applicant: R2DI2 AG, Rugell (LI)

(72) Inventor: Frank Dieterle, Schiltach (DE)

( * ) Notice: Subject to any disclaimer, the term of this patent is extended or adjusted under 35 U.S.C. 154(b) by 0 days.

(21) Appl. No.: 15/301,546

(22) PCT Filed: Apr. 4, 2014

(86) PCT No.: PCT/EP2014/056795
§ 371 (c)(1),
(2) Date: Oct. 3, 2016

(87) PCT Pub. No.: WO2015/149863
PCT Pub. Date: Oct. 8, 2015

(65) Prior Publication Data
US 2017/0022675 A1    Jan. 26, 2017

(51) Int. Cl.
| *E01F 9/669* | (2016.01) |
| *E01D 19/00* | (2006.01) |
| *E01D 19/10* | (2006.01) |
| *F16B 33/00* | (2006.01) |

(52) U.S. Cl.
CPC ............ *E01D 19/00* (2013.01); *E01D 19/10* (2013.01); *E01D 19/103* (2013.01); *E01F 9/669* (2016.02); *F16B 33/004* (2013.01); *F16B 33/008* (2013.01)

(58) Field of Classification Search
CPC .......... E01D 19/10; E01F 9/541; E01F 9/658; E01F 9/669
USPC .................................................. 404/7; 14/74
See application file for complete search history.

(56) References Cited

U.S. PATENT DOCUMENTS

| 2,307,348 | A | * | 1/1943 | Anderson | ............... | F16B 15/02 |
| | | | | | | 411/487 |
| 5,519,973 | A | * | 5/1996 | Keith | .................... | B28B 19/003 |
| | | | | | | 52/410 |
| 7,344,333 | B2 | * | 3/2008 | Iwasaki | .................. | E04H 6/426 |
| | | | | | | 404/7 |
| 7,758,278 | B2 | * | 7/2010 | Tamburro | ............. | E01C 11/222 |
| | | | | | | 248/530 |
| D623,507 | S | * | 9/2010 | Bowen, III | .................... | D8/391 |
| 8,226,321 | B2 | * | 7/2012 | Meyers | ................. | E01F 15/003 |
| | | | | | | 404/6 |
| 2007/0116514 | A1 | * | 5/2007 | Woytowich | ............. | E01F 9/529 |
| | | | | | | 404/7 |
| 2017/0233962 | A1 | * | 8/2017 | Desideriosciolì | ........ | B65G 1/02 |
| | | | | | | 404/6 |

FOREIGN PATENT DOCUMENTS

| DE | 195 37 399 C1 | 10/1996 |
| DE | 20 2008 001661 U1 | 4/2008 |

(Continued)

*Primary Examiner* — Gary S Hartmann
(74) *Attorney, Agent, or Firm* — Pauley Erickson & Kottis

(57) ABSTRACT

A bridge cap which for fastening to a bridge has a fastening unit with a fastener and with a guide device that includes a cylindrical anchor sleeve. This invention also relates to a fastening unit for fastening a bridge cap. The fastening unit is composed of separate individual parts, which in addition to the anchor sleeve, include a separate transition piece that has a first cylindrical section adapted to the diameter of the anchor sleeve and a second cylindrical section oriented away from the first and oriented toward an outside of the bridge cap.

31 Claims, 8 Drawing Sheets

(56) References Cited

FOREIGN PATENT DOCUMENTS

| | | |
|---|---|---|
| DE | 10 2009 007 442 A1 | 9/2009 |
| EP | 2 042 657 A1 | 4/2009 |
| EP | 2 466 008 A2 | 6/2012 |

\* cited by examiner

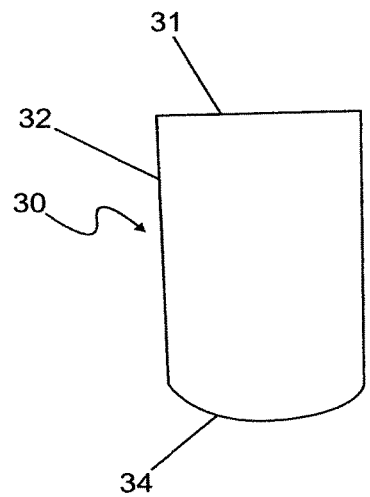
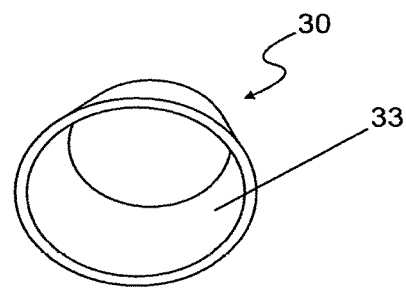
FIG. 4A
FIG. 4B
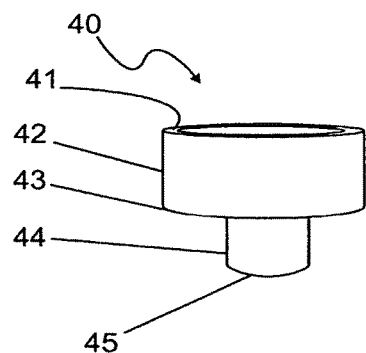
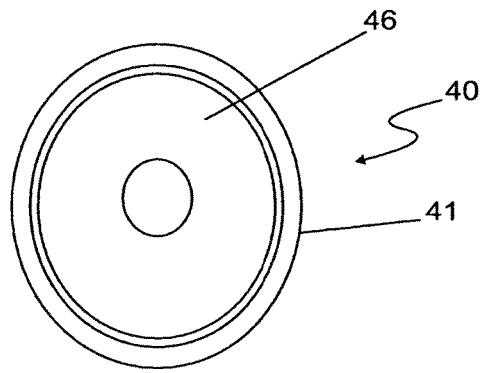
FIG. 5A
FIG. 5B

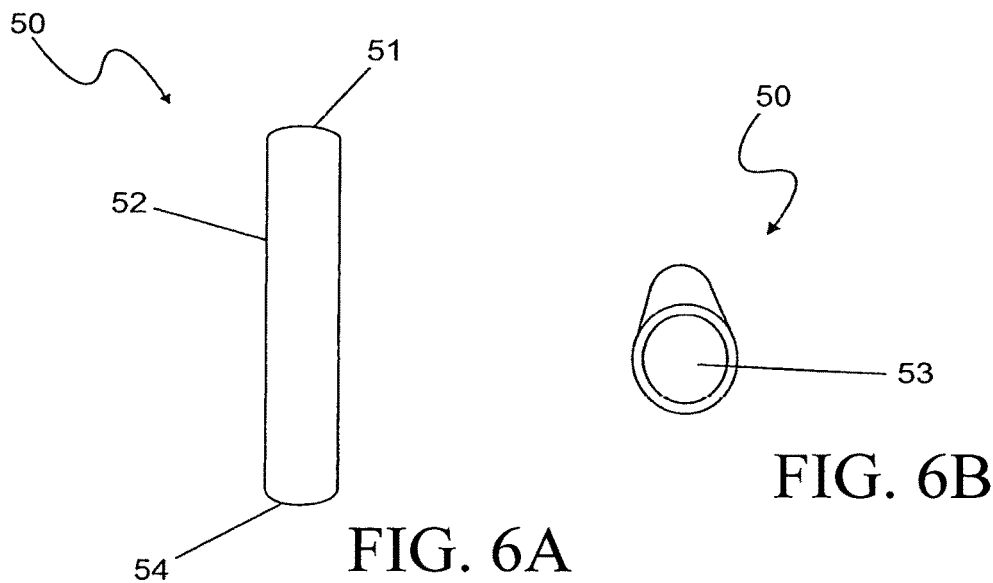
FIG. 6A
FIG. 6B
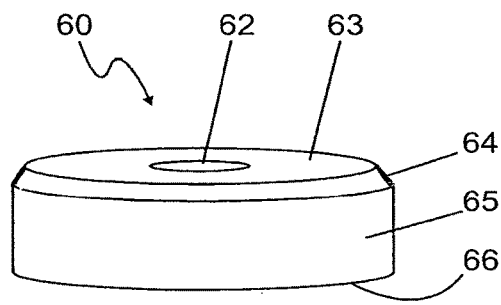
FIG. 7A
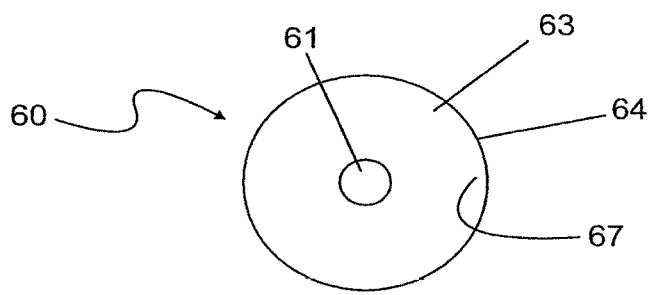
FIG. 7B

BRIDGE CAP AND FASTENING UNIT FOR FASTENING A BRIDGE CAP

BACKGROUND OF THE INVENTION

Field of the Invention

This invention relates to a bridge cap, which for fastening to a bridge has a fastening unit with a fastener and has a guide device which includes a cylindrical anchor sleeve. This invention also relates to a fastening unit for fastening a bridge cap.

Discussion of Related Art

A bridge cap of this kind is disclosed in German Patent Reference DE 10 2009 007 442 B4. In this case, the bridge cap is fastened to the side parts of a bridge or bridge section by fasteners. The fasteners are guided through openings provided in the bridge cap, which each has a lost anchor sleeve. Above the anchor sleeve, there is an expanded opening section, which in the installed state of the bridge cap, is covered by a cover. In addition, the anchor sleeve is adjoined underneath by a plate element. Such an embodiment of the opening offers advantages, for example with regard to leak-tightness and an accompanying corrosion resistance in the assembled state. But this embodiment can require a certain amount of effort in the production and installation of the bridge cap.

SUMMARY OF THE INVENTION

One object of this invention is to provide a bridge cap with a fastening unit of the type mentioned above but which, while requiring little production and assembly effort, permits a stable and resistant attachment of a bridge cap to a bridge. A further object is to provide such a fastening unit.

These objects and others are attained by the bridge cap with the features and by the fastening unit, both with features discussed in this specification and in the claims. In the bridge cap, the fastening unit is composed of separate, individual parts, which in addition to the anchor sleeve, include a separate transition piece that has a first cylindrical section adapted to the diameter of the anchor sleeve and a second cylindrical section oriented away from the first and oriented toward an outside of the bridge cap.

With regard to the fastening unit, the fastening unit is composed of separate, individual parts, which in addition to the anchor sleeve, include a separate transition piece that has a first cylindrical section adapted to the diameter of the anchor sleeve and a second cylindrical section oriented away from the first cylindrical section.

The composition of individual parts is advantageous because the parts can easily be pre-installed during the production of a bridge cap, thus making it easy to produce and mount the bridge cap. This significantly reduces the production and assembly cost. In addition, the modular design according to this invention permits some parts, in particular the anchor sleeve, to be purchased as standard components (pipe), which makes production and adaptation to given requirements simple and also reduces costs.

In one embodiment of this invention, the individual parts of the fastening unit also have a bottom part that is expanded in comparison to the anchor sleeve, with an opening that is adapted to the diameter of the anchor sleeve, with the bottom part being accommodated in a recess on the contact side of the bridge cap remote from the outside. The bottom part offers an advantageous introduction of forces into the wing of the bridge by screw anchors. This embodiment can also increase the leak-tightness if the bottom part presses into a seal, which is situated between the bridge and the bridge cap, and is embodied, for example, as bitumen sheeting.

A simple variability in the use of the fastening unit in bridge caps of different thicknesses is achieved if the individual parts of the fastening unit again have a compensation sleeve whose diameter is adapted to the second cylindrical section with a length such that the compensation sleeve extends the guide device from the transition piece at least into the vicinity of the outside of the bridge cap. It is thus possible to simply adapt the fastening units to bridge caps of different thicknesses d. In this case, the adaptation to the bridge cap thickness can take place, for example, by the compensation sleeve, which preferably comprises a pipe that is to be cut to length and thus constitutes an advantageous standard component. The extension at least into the vicinity of the outside makes it possible to provide the compensation sleeve with a sealing element such as a cover. Another adaptation is possible by the length of the anchor sleeve.

Protection of the fastener from external influences is provided by a cover that makes it possible to seal the compensation sleeve off from the outside.

For a simplified assembly, it is advantageous if the compensation sleeve has a larger diameter than the anchor sleeve, with the transition piece transitioning from the diameter of the compensation sleeve to the diameter of the anchor sleeve. This permits the fastener, which is guided from the compensation sleeve through the anchor sleeve, to be more easily actuated by a tool through form-fitting engagement for installation and removal.

The possibility of the fastening unit being aligned with the bridge in the direction of the surface normal of the outside of a top section or of a side section of the bridge cap or of the contact side of the bridge cap or of it being aligned so that it is inclined at an angle of at least 10° relative to the surface normal first of all provides a high degree of flexibility with regard to the installation site of the fastening unit. On the other hand, the inclined position in particular produces increased forces, for example relative to impact loads that act on the curbstone or the bridge cap in the horizontal direction. At the same time, a stable clamping of the bridge cap against the wing of the bridge is achieved.

Assembly is simplified if at least the compensation sleeve, the transition piece, and the anchor sleeve are already inserted into the bridge cap during the production of the bridge cap.

In one embodiment, in a transition region between the first and second cylindrical section, the transition piece of the fastening unit has a contact surface for a head element of the fastener; when the fastener is inserted all the way in, a threaded section oriented away from the head element protrudes beyond the contact side of the bridge cap to produce the connection to the bridge. It is not necessary to provide a washer. In addition, the head element of the fastener in the transition piece is protected from the external environment because it is adjoined toward the outside by the second cylindrical section, which can be closed with the cover, and possibly by the compensation sleeve, which can be closed with the cover.

If the cover is embodied so that it has a seal and/or a covering section with a bevel and so that it is inserted with a cylindrical section into the compensation sleeve, then this offers various advantages. On the one hand, the cover is easy to install. On the other hand, the seal makes it possible to protect the fastener that is guided in the guide device from corrosion-promoting liquids such as salt water. The cylindrical section offers good guidance, stable positioning, and good adaptability of the cover in the compensation sleeve that accommodates the cover.

The option of embodying the fastener as a screw that can be loosened again facilitates a possible removal.

The use of individual parts of the fastening unit which also have a bottom part that is expanded relative to the anchor sleeve, with an opening that is adapted to the diameter of the anchor sleeve facilitates an advantageous introduction of forces into the wing of the bridge by the screw anchor.

For use with bridge caps of variable thicknesses d, it is advantageous that the individual parts of the fastening unit also include a compensation sleeve whose diameter is adapted to the second cylindrical section.

A protected environment inside the guide device is ensured by providing a cover by which the compensation sleeve can be closed starting at its upper edge oriented away from the transition piece.

Assembly is facilitated if the compensation sleeve has a larger diameter than the anchor sleeve. The transition piece transitions from the diameter of the compensation sleeve to the diameter of the anchor sleeve.

If the upper edge of the compensation sleeve lies in a plane, which is expanded perpendicularly or obliquely relative to the longitudinal center line, then the fastening unit can be installed in a bridge cap and can be oriented in the direction of a surface normal or inclined at a defined angle of at least 10° relative to the surface normal also makes it possible to achieve an attachment that is stable, even relative to horizontally acting forces.

For exerting clamping forces when fastening bridge caps, it is advantageous if in a transition region between the first and second cylindrical section, the transition piece of the fastening unit has a contact surface for a head element of the fastener. As a result, it is also not necessary, for example, to provide a washer.

With an embodiment of the cover that has a seal and/or has a cover section with a bevel and such that it is inserted with a cylindrical section into the compensation sleeve achieves advantages with regard to assembly, leak-tightness, positioning, and adaptability of the cover.

If the cylindrical section is provided with a circumferential groove into which the seal is inserted, the groove promotes a secure seating of the seal. Thus, it is possible for example to use an O-ring as the seal, which is an advantageous standard component.

A fastener in the form of a screw that can be loosened again permits a simple removal.

If the individual parts of the fastening unit can be or are at least partially preassembled this enables a simple insertion of at least parts of fastening unit during the production of a bridge cap.

BRIEF DESCRIPTION OF THE DRAWINGS

This invention is explained in greater detail in view of exemplary embodiments and referring to the drawings, wherein:

FIG. 4A is a side view of a compensation sleeve, according to FIG. 2;
FIG. 4B shows a compensation sleeve according to FIG. 2, in a perspective view from above;
FIG. 5A shows a transition piece according to FIG. 2, in a perspective view from the side;
FIG. 5B is a top view of the transition piece, according to FIG. 2;
FIG. 6A is a side view of an anchor sleeve, according to FIG. 2;
FIG. 6B shows an anchor sleeve according to FIG. 2, in a perspective view from above;
FIG. 7A shows a bottom part according to FIG. 2, in a perspective view from the side;
FIG. 7B is a top view of the bottom part according to FIG. 2.

DETAILED DESCRIPTION OF THE INVENTION

Figure 1:
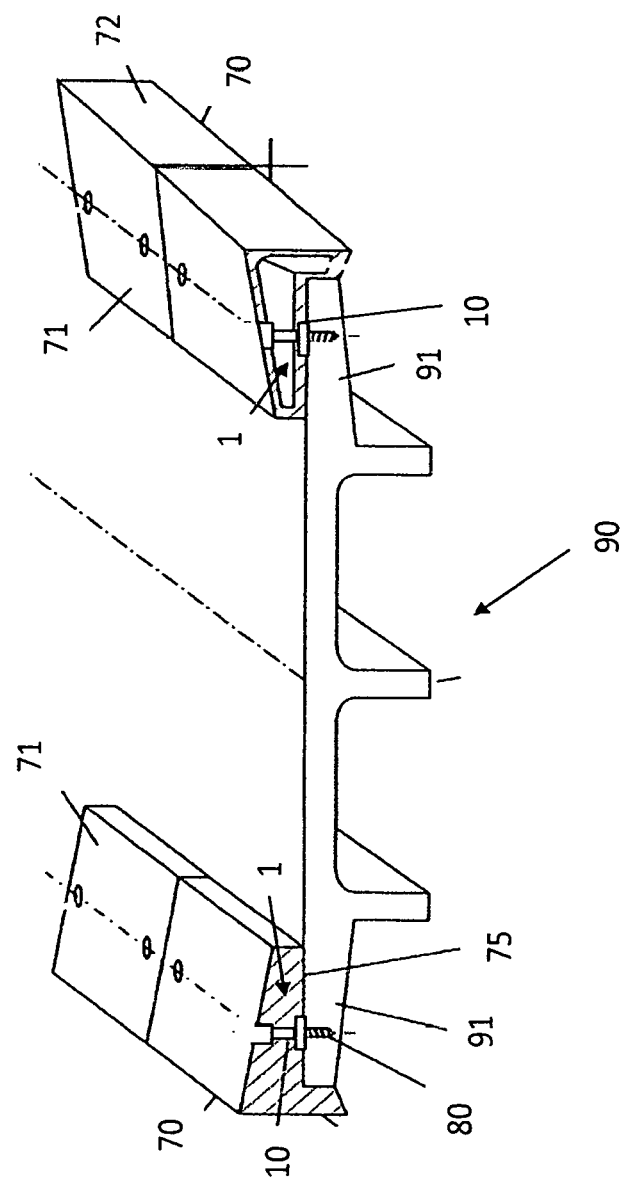
FIG. 1 is a perspective schematic view of a bridge with bridge caps.

FIG. 1 shows a bridge section 90 with side parts 91 that constitute or form the lateral end in the longitudinal direction of the bridge section 90. Segmented bridge caps 70 that are embodied as separate components are fastened to the side parts 91. The bridge caps 70 can be embodied as solid, without cavities (left side in FIG. 1) or can be provided with cavities (right side in FIG. 1). With a corresponding embodiment, the cavities can be used for installing cables, pipes, or the like. A curbstone, such as composed of natural stone, can be fastened to or integrated into the bridge caps 70.

The bridge caps 70, which are L-shaped when viewed in cross-section, are brought at least partially into contact with the bridge by a contact side 75. They have top sections 71, which rest on top of side parts 91, and side sections 72, which laterally embrace the side parts 91 of the bridge section 90. The side sections 72 of the bridge cap 70 thus offer a lateral protection of the bridge section 90 and promote a stable position of the bridge cap 70. In addition to the position, the bridge cap 70 can also be mounted in other regions, such as with the top section 71 placed against the side parts 91 from beneath. Another embodiment of the bridge cap 90 is also possible, for example without side sections 72, which could also be mounted between two lanes.

The bridge cap 70 is mounted to the side parts 91 by fastening units 1, which each have a respective fastener 80 and a guide device 10 inserted into the bridge cap 70. The fasteners 80 are provided in the form of bolts, in particular detachable screw connections, which engage with counterpart elements that are adapted to them in position and shape. In this case, the screws are embodied as self-tapping, for example, in order to facilitate fastening and are made of a non-rusting material. The other individual parts of the fastening unit 1 are made of corrosion-resistant material.

Figure 2:
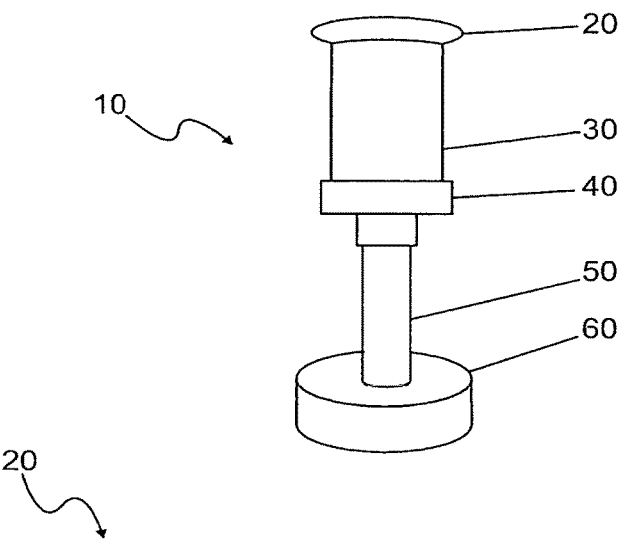
FIG. 2 is a side view of a guide device of a fastening unit.

FIG. 2 shows the guide device 10 as well as a cover 20 for closing the guide device 10 in one embodiment. It includes a plurality of individual parts, which are arranged along a common, vertically extending longitudinal centerline. At the top is the cover 20. The cover 20 is adjoined on its underside by a cylindrical compensation sleeve 30, which connects to a transition piece 40 that encompasses it circumferentially. The transition piece 40 leads to a cylindrical anchor sleeve 50 to which a bottom part 60 is connected.

Figure 3A:
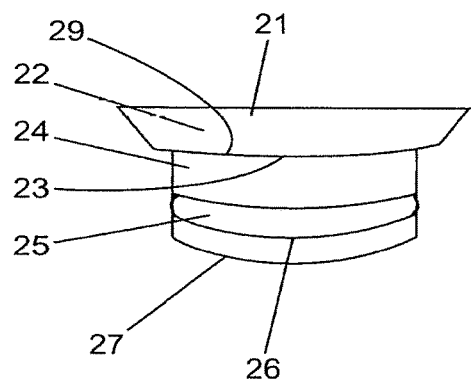
FIG. 3A is a side view of a cover, according to FIG. 2.

As shown in FIGS. 3A and B, the cover 20 has a disc-like covering section 21 with a bevel 22, which transitions into an annular surface 23 oriented in the direction of a cylindrical section 24. The annular surface 23 constitutes or forms a step-like transition to the cylindrical section 24, which adjoins the covering section 21. It is produced by the fact that the underside of the covering section 21 has a larger diameter than a top of the cylindrical section 24. The cylindrical section 24 is provided with a circumferential groove 26 whose shape is adapted to a seal 25, into which groove the seal 26 is inserted. The groove 26 ensures a defined and stabilized position of the seal 25, which in this case is embodied as an O-ring, and ensures a good seal. It is also possible to use a seal with a different shape, for example with a square cross-section, and/or to use a plurality of seals 25. The seal 25 could also be mounted to a different section of the cover 20, such as to its annular surface 23, in which case a flat embodiment would be advantageous. The end of the cover 20 remote from the covering section 21 is composed of a flat underside 27 or a terminal edge of the cylindrical section 24 that is hollow or is composed of solid material.

The compensation sleeve 30 adjoining the cover 20, as shown in FIGS. 4A and 4B, is of or composed of a cylindrical pipe. The diameter of the pipe is such that it encompasses the cylindrical section 24 of the cover 20 in a form-fitting fashion.

Figure 3B:
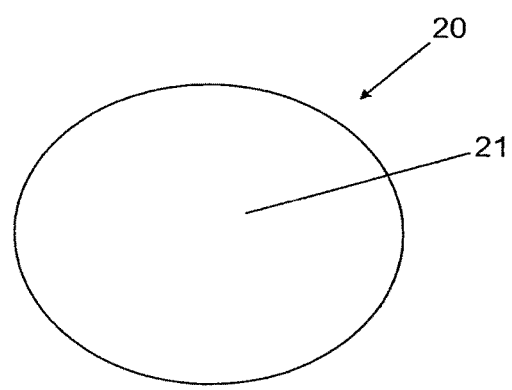
FIG. 3B is a top view of a cover, according to FIG. 2.

As shown in FIG. 3A, the compensation sleeve 30 has a circumferential upper terminal edge 34 of the compensation sleeve 31 spaced radially apart from the longitudinal centerline, an outer surface 32, and a circumferential lower terminal edge 34 spaced radially apart from the longitudinal center line. FIG. 3B shows the inner surface of the compensation sleeve 33.

FIGS. 5A and 5B show the transition piece 40, which extends between the compensation sleeve 30 and the anchor sleeve 50, as shown in FIG. 2. It is hollow in order to accommodate and guide a fastener 80 that extends through it. The transition piece 40 has a circumferential upper terminal edge 41, which is spaced radially apart from the longitudinal centerline and extends in the direction of the compensation sleeve 30. The upper edge 41 delimits a second cylindrical section 42 in in the direction of the compensation sleeve 30. At the end opposite from the upper edge 41, the second cylindrical section 42 is adjoined by a step-like transition region 43 that has a radially extending annular surface 46 arranged concentric to the longitudinal center line, which is visible in FIG. 5B. At the end remote from the upper edge of the transition piece 41, the transition region 43 transitions into a first cylindrical section 44 that is likewise arranged concentric to the longitudinal centerline. The first cylindrical section 44 has a smaller diameter than the second cylindrical section 42. The first cylindrical section 44 comes to an end at a circumferential lower terminal edge 45, which is spaced radially apart from the longitudinal centerline and extends in the direction of the anchor sleeve 50. The inner diameters of the first and second cylindrical sections 44 and 42 are embodied such that the respective ends of the anchor sleeve 50 and the compensation sleeve 30 can be inserted into them in a form-fitting fashion.

Like the compensation sleeve 30, the anchor sleeve 50 shown in FIGS. 6A and 6B is of or composed of a cylindrical pipe. In comparison to the compensation sleeve 30, however, it has a smaller diameter. FIG. 6A shows a circumferential upper terminal edge 51 of the anchor sleeve, which is spaced radially apart from the longitudinal centerline, an outer surface 52, and a circumferential lower terminal edge 54 of the anchor sleeve, which is spaced radially apart from the longitudinal center line. FIG. 6B also shows the inner surface of the anchor sleeve 53.

As shown in FIG. 2, the guide device 10 also has a bottom part 60. This is shown in greater detail in FIGS. 7A and 7B. As shown in FIGS. 7A and 7B, the bottom part 60 is embodied as cylindrical and is provided with a centered opening 61, which has an opening wall 62 that is visible in FIG. 7A. It is also possible for the bottom part to be a different shape, for example polygonal, in particular square. The opening 61 could also be provided with a fitting that extends the opening wall 62 upward. The smoothly embodied top surface 63 transitions via a transition bevel into a cylindrical side surface 65, which is adjoined by a bottom surface 66 oriented away from the top surface 63. FIG. 7B shows bores 67, which can extend to the bottom side 66 and can be used as fastening points. The bores can also be used for positioning the bottom part 60 on adjusting mandrels during production.

Figure 8:
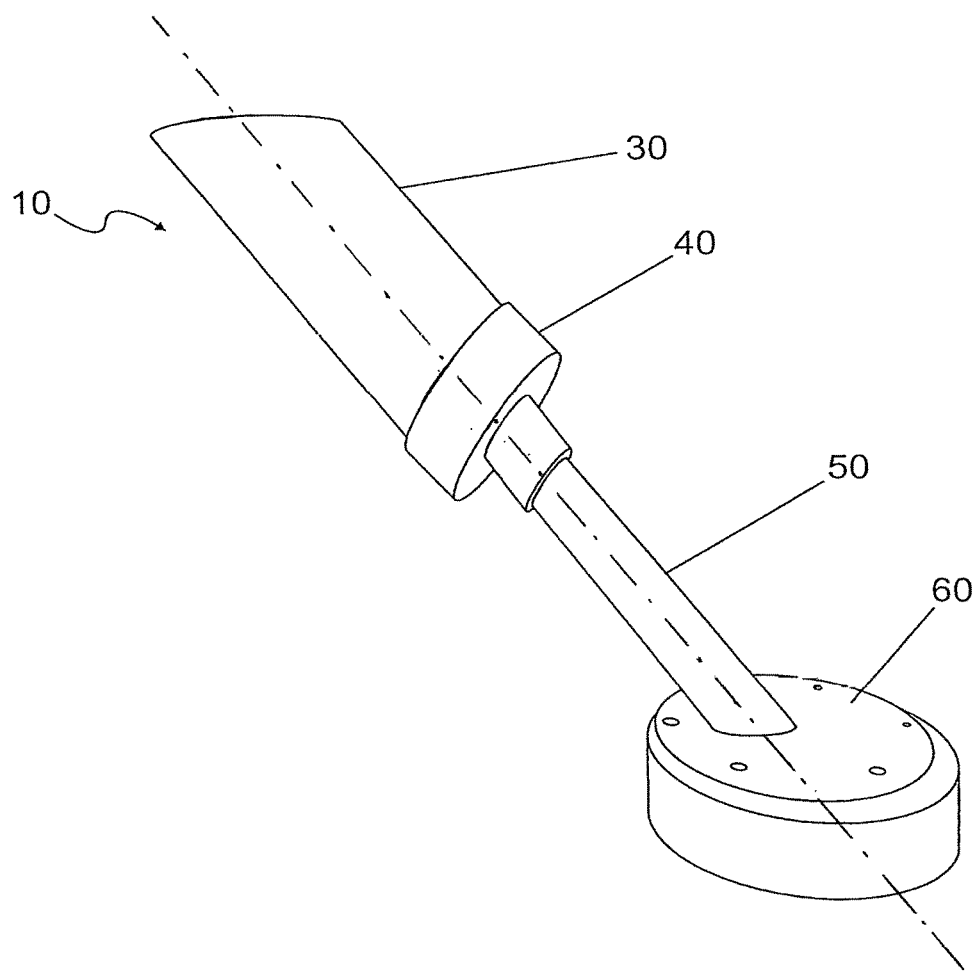
FIG. 8 shows a guide device of a fastening unit in an oblique perspective view from the side.

FIG. 8 shows another variant of the guide device 10 in which, by contrast with FIG. 2, no cover 20 is shown. In this case, its longitudinal centerline extends obliquely, such as at an angle relative to the normal of the surface on which the bottom plate 60 is positioned. The description below will focus only on the differences in comparison to the embodiment shown in FIG. 2. In this discussion, the same reference numerals are used for the same functional parts and in order to avoid repetition, reference is made to the foregoing statements.

Figure 9A:
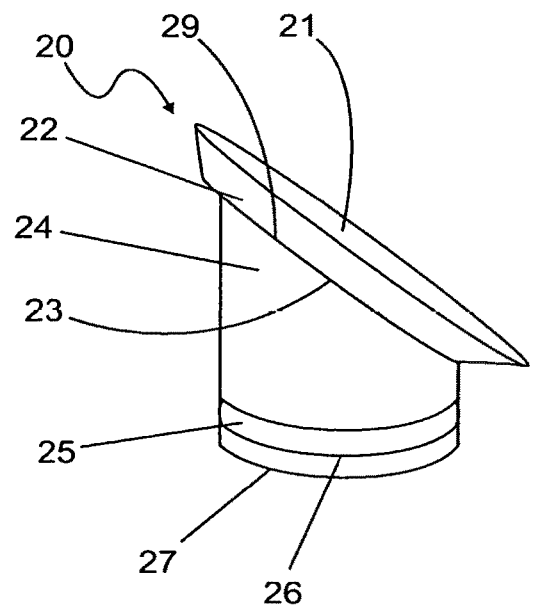
FIG. 9A is a side view of a cover for a guide device according to FIG. 8.
Figure 9B:
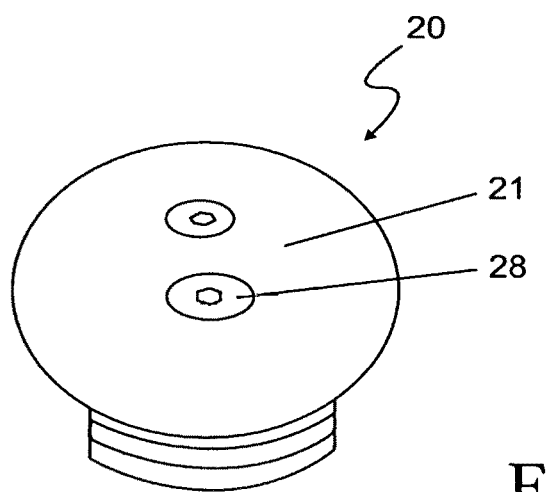
FIG. 9B is a top view of a cover according to FIG. 9A.
Figure 10A:
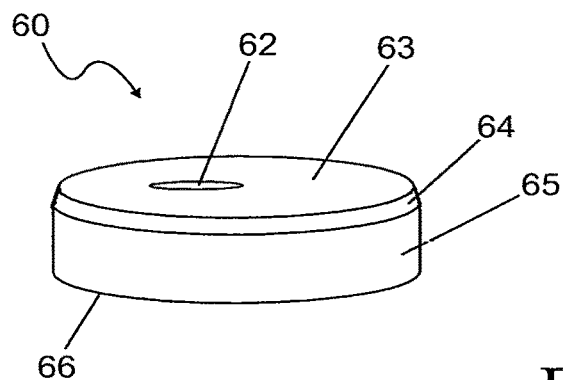
FIG. 10A shows the bottom part according to FIG. 8, in a perspective view from the side.
Figure 10B:
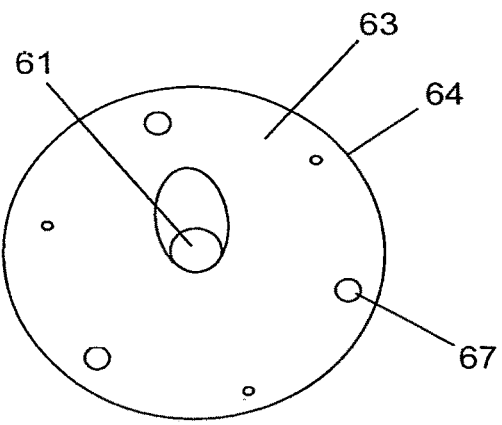
FIG. 10B is a top view of the bottom part according to FIG. 8.

The cover 20, which is provided for use with the guide device 10 from FIG. 8, is shown in FIGS. 9A and 9B. In this case, the cover 20 is embodied so that the covering section 21 that is attached to the cylindrical section 24 is situated, for example, parallel to the surface on which the bottom plate 60 is positioned. When inserted, the cylindrical section is coaxial to the longitudinal centerline of the guide device 10. This embodiment is achieved in that the top surface 29 of the cylindrical section 24 on which the covering section 21 rests is oriented obliquely relative to the longitudinal center line so that it extends, for example, parallel to the surface on which the bottom plate 60 is positioned. The underside 27, however, extends in a plane oriented at right angles to the longitudinal center line or has a circumferential edge spaced radially apart from it extending in this plane. FIG. 9B also shows a fixing or fixing means 28 for fixing the covering section 21 in position on the cylindrical section 24, which are preferably embodied in the form of screws and are sunk flush into the covering section 21 so that they ensure a smooth surface. To accommodate a tool in a form-fitting fashion, they have hexagonal openings, but these can also have a different shape. The cover 20 could also be fastened in a different way, for example by being glued. The cover 20 that is embodied in the above-described way can close the compensation sleeve 30, which extends axially relative to the longitudinal centerline, in a flush, leak-tight fashion. This is because, as is clear from FIG. 8, the upper edge of the compensation sleeve 31 is likewise formed so that it is arranged parallel to the surface on which the bottom plate 60 is positioned or is arranged parallel to the adjacent top surface of the bridge cap. The lower edge of the compensation sleeve extends in a plane oriented at right angles to the longitudinal centerline.

The transition piece 40 and anchor sleeve 50 shown in FIG. 8 correspond in their form to the parts respectively described in FIGS. 5A and 5B and 6A and 6B. The bottom plate 60 shown in FIG. 8, however, has differences relative to the embodiment according to FIG. 2 in that the opening wall 62 of the opening 61 extends along the longitudinal centerline, while the top and bottom sides 63 and 66 extend parallel to the surface. Consequently, the compensation sleeve 30 and the anchor sleeve 50 are shown inclined obliquely relative to the bottom plate 60, as shown in FIG. 8.

The individual parts can be at least partially preassembled according to FIG. 2. Thus, the compensation sleeve 30 and the anchor sleeve 50 are each inserted in a form-fitting fashion into the respective second and first cylindrical section 42 and 44, respectively, of the transition piece 40. Advantageously, the sleeves are inserted into the transition piece 40 instead of the sleeves being slid over the transition piece 40. This avoids the presence of a step inside the sleeve in the assembled state. One connection variant in this case is to screw the sleeve into the transition piece 40. In this case, a thread is provided on the parts of the compensation sleeve 30 and anchor sleeve 50 that protrude into the transition piece 40 and is provided in the inner walls of the cylindrical sections 42 and 44. Preferably, the components are inserted into one another. During the insertion of the compensation sleeve 30, the annular surface 46 of the transition piece 40 can function as a stop. It is also possible to embody the annular surface 46 in such a way that it protrudes somewhat into the annular opening toward the second cylindrical section in order to likewise function as a stop for the upper edge of the anchor sleeve 51.

Optionally, it is also possible for the bottom part 60 to already be preassembled by being fastened to the anchor sleeve 50. Thus, the anchor sleeve 50 can likewise be screwed or inserted into the bottom part or also be fastened by lateral connecting pieces, such as by welding.

Figure 11:
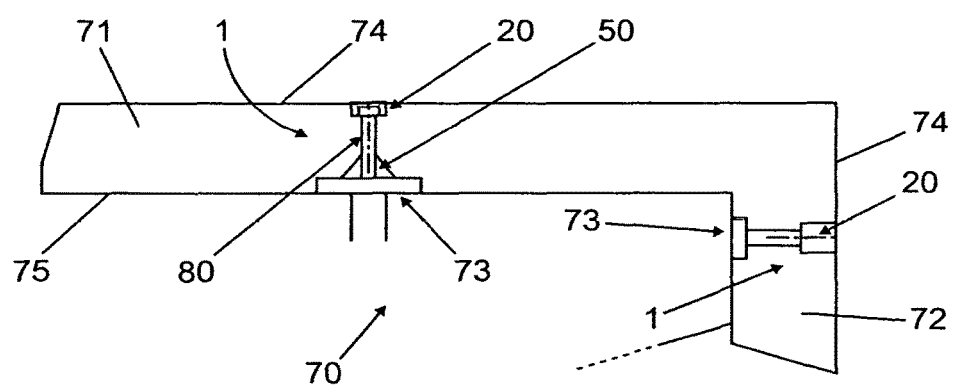
FIG. 11 is a schematic side view of a bridge cap with one fastening unit at the top and one fastening unit at the side.

The preassembled parts can then be simply inserted into the bridge caps 70 during the production of the bridge caps 70, for example by being cast into them. The bottom part 60 in this case is situated in a recess 73 of the bridge cap 70 so that it comes to an end flush with the lower surface (contact side 75) of the bridge cap 70 or protrudes slightly, at least not to a large degree, and apart from this the bridge cap 70 is at least partially supported in a stable fashion on its contact side 75. In this case, the anchor sleeve 50 points in the direction of the contact side 75 and the compensation sleeve 30 points in the direction of the outside 74 of the bridge cap 70 oriented away from the contact side 75. The guide device 10 can be oriented in the direction of the surface normal of an outside 74 of the top section 71, a side section 72 of the bridge cap 70, or the outside 75 of the bridge cap oriented toward the bridge, as shown by way of example in FIG. 11. It can also be oriented at an oblique angle of at least 10° relative to the relevant surface normal.

In addition, the guide device 10 can be adapted to bridge caps 70 of different thicknesses d in that compensation sleeves 30 of different lengths are used or these are correspondingly cut to length before or after installation. The length adaptation by the compensation sleeve 30 that is preferably of or composed of a pipe is advantageous because this permits an advantageous standard component to be used for the pipe. In the adapted state, the compensation sleeve 30 should extend at least close to the outside 73 of the bridge cap 70 so that the cover 20 can be placed onto the compensation sleeve 30 in a sealed fashion. The compensation sleeve could also be omitted, for example in the event of small thicknesses d of the bridge cap 70. Then, the cover 20 is advantageously formed so that it can be placed onto the transition piece 40 in a sealed fashion.

In the unassembled state, both when embodied for installation in the normal direction and when embodied for installation in the oblique direction, the above-described individual parts of the fastening unit 1 constitute or form an adapted kit or one that can be easily adapted to the installation situation.

When the bridge cap 70 is installed on a bridge section 90, the guide device 10 functions as both a passage and a receptacle for the fastener 80. In addition, it is suitable for use as a drilling jig, for example for mounting counterpart elements of the fasteners 80 to the bridge. The fact that the diameter of the compensation sleeve 30 is enlarged relative to that of the anchor sleeve 50 permits the fastener 80 to be easily inserted into the guide device, fed through the anchor sleeve 50, preferably with a small amount of play, and clamped into the relevant counterpart element of the bridge through the use of a tool in such a way that it exerts the clamping forces required to fasten the bridge cap 70. In this connection, the head element of the fastener 80 comes into contact with the annular surface 46 of the transition piece 40, which consequently functions as an abutment in order to absorb the clamping forces over a larger area. During the clamping of the fastener 80, the bottom part 60 of the guide device 10 is also pressed against a sealing device situated between the contact side 75 of the bridge cap 70 and the bridge section 90. This produces an advantageous sealing action preventing, for example, the penetration of corrosion-promoting liquids such as salt water into the relevant elements of the fastening devices 80. Likewise for protection from such media, in the assembled state, the guide device 10 is closed in a sealed and flush fashion with a cover, which can in particular be the cover 20. The cover 20 is provided with the bevel 22 to facilitate assembly for this purpose. Alternatively, a seal of or composed, for example, of bitumen could also be used.

The above descriptions of the fastening unit 1 for fastening a bridge cap 70 demonstrate that with its being composed of individual parts and having a design that allows it to be partially preassembled, such a fastener can already be inserted into the bridge cap 70 during the production of the latter. With the fasteners 80 and the fitting covers 20 provided, it is thus possible to produce a bridge cap 70 with a fastening unit 1 that is prepared for a simple assembly. The construction from individual parts also enables a flexible adaptation to different installation positions and thicknesses d of different bridge caps, permitting the use of standard components, which optimizes costs.

The invention claimed is:

1. A bridge cap (70) for fastening to a bridge (90), comprising:
   a fastening unit (1) with a fastener (80) and a guide device (10);
   the guide device including a cylindrical anchor sleeve (50) and a separate transition piece (40) connected to the anchor sleeve (50), the transition piece (40) having a first cylindrical section (44) configured to receive a diameter of the anchor sleeve (50) and a second cylindrical section (42) oriented away from the first cylindrical section (44), wherein the second cylindrical section (42) is disposed toward an outside (74) of the bridge cap (70).

2. The bridge cap (70) according to claim 1, wherein the guide device (10) further includes a bottom part (60) having a diameter greater than the anchor sleeve (50), and including an opening (61) configured to receive the diameter of the anchor sleeve (50), wherein the bottom part (60) is configured to fit within a recess (73) on a bridge contact side (75) of the bridge cap (70) that is opposite from the outside (74) of the bridge cap (70).

3. The bridge cap (70) according to claim 2, wherein the guide device (10) further includes a compensation sleeve (30) with a diameter that fits within the second cylindrical section (42) and with a length such that the compensation sleeve (30) extends the guide device (10) from the transition piece (40) through the bridge cap (70) and adjacent the outside (74) of the bridge cap (70).

4. The bridge cap (70) according to claim 3, wherein the guide device (10) further includes a cover (20) by which the compensation sleeve (30) can be closed from the outside (74) of the bridge cap (70).

5. The bridge cap (70) according to claim 4, wherein the compensation sleeve (30) has a larger diameter than the anchor sleeve (50), and the transition piece (40) is a transition element between the diameter of the compensation sleeve (30) and the diameter of the anchor sleeve (50).

6. The bridge cap (70) according to claim 5, wherein in a transition region (43) between the first and second cylindrical sections (44, 42), the transition piece (40) of the fastening unit (1) has a contact surface for a head element of the fastener (80); wherein when the fastener (80) is inserted against the contact surface, a threaded section of the fastener (80) oriented away from the head element protrudes beyond the contact side (75) of the bridge cap (70) to produce a connection to the bridge.

7. The bridge cap (70) according to claim 6, wherein the cover (20) has a seal (25) and/or a covering section (21) with a bevel (22) and the cover (20) is inserted with a cylindrical section (24) into the compensation sleeve (30).

8. The bridge cap (70) according to claim 7, wherein the fastener (80) is a screw.

9. The bridge cap (70) according to claim 1, wherein the guide device includes a compensation sleeve (30) with a diameter that fits within the second cylindrical section (42) and with a length such that the compensation sleeve (30) extends the guide device (10) from the transition piece (40) through the bridge cap (70) and adjacent the outside (74) of the bridge cap (70).

10. The bridge cap (70) according to claim 3, wherein the compensation sleeve (30) has a larger diameter than the anchor sleeve (50), with the transition piece (40) transitioning from the diameter of the compensation sleeve (30) to the diameter of the anchor sleeve (50).

11. The bridge cap (70) according to claim 1, wherein the fastening unit (1) is aligned with the bridge in a direction of the surface normal of the outside (74) of a top section (71), of a side section (72) of the bridge cap (70), or of the contact side (75) of the bridge cap (70), or is aligned so that it is inclined at an angle of at least 10° relative to a surface normal.

12. The bridge cap (70) according to claim 3, wherein at least the compensation sleeve (30), the transition piece (40), and the anchor sleeve (50) are inserted into the bridge cap (70).

13. The bridge cap (70) according to claim 1, wherein in a transition region (43) between the first and second cylindrical sections (44, 42), the transition piece (40) of the fastening unit (1) has a contact surface for a head element of the fastener (80); when the fastener (80) is inserted, a threaded section of the fastener (80) oriented away from the head element protrudes beyond the contact side (75) of the bridge cap (70) to produce a connection to the bridge.

14. The bridge cap (70) according to claim 4, wherein the cover (20) has a seal (25) and/or a covering section (21) with a bevel (22) and the cover (20) is inserted with a cylindrical section (24) into the compensation sleeve (30).

15. The bridge cap (70) according to claim 1, wherein the fastener (80) is a screw.

16. The bridge cap (70) according to claim 1, wherein the first cylindrical section (44) is configured to receive a first end of the anchor sleeve (50).

17. The bridge cap (70) according to claim 1, wherein the guide device (10) further includes as one of the individual parts a bottom part (60) having a diameter larger than the anchor sleeve (50), and an opening (61) that is configured to receive a second end of the anchor sleeve (50).

18. The bridge cap (70) according to claim 17, wherein the guide device (10) further includes as one of the individual parts a compensation sleeve (30) with a diameter adapted to fit within the second cylindrical section (42).

19. The bridge cap (70) according to claim 18, wherein a cover (20) is provided by which the compensation sleeve (30) can be closed at an upper edge (41) oriented away from the transition piece (40).

20. The bridge cap (70) according to claim 18, wherein the compensation sleeve (30) has a larger diameter than the anchor sleeve (50), with the transition piece (40) transitioning from the diameter of the compensation sleeve (30) to a diameter of the anchor sleeve (50).

21. The bridge cap (70) according to claim 18, wherein the upper edge (41) of the compensation sleeve (30) lies in a plane perpendicularly or obliquely relative to a longitudinal centerline wherein the fastening unit (1) is installed in a bridge cap (70) and oriented in a direction of a surface normal or inclined at a defined angle of at least 10° relative to the surface normal.

22. The bridge cap (70) according to claim 21, wherein in a transition region (43) between the first and second cylindrical sections (44, 42), the transition piece (40) of the fastening unit (1) has a contact surface for a head element of the fastener (80).

23. The bridge cap (70) according to claim 22, wherein the cover (20) has a seal (25) and/or a covering section (21) with a bevel (22) and the cover (20) is inserted with a cylindrical section (24) into the compensation sleeve (30).

24. The bridge cap (70) according to claim 23, wherein the cylindrical section (24) is provided with a circumferential groove (26) into which the seal (25) is inserted.

25. The bridge cap (70) according to claim 24, wherein the fastener (80) is a screw.

26. The bridge cap (70) according to claim 17, wherein the individual parts of the fastening unit (1) are at least partially preassembled.

27. The bridge cap (70) according to claim 1, wherein the individual parts of the fastening unit (1) are at least partially preassembled.

28. The bridge cap (70) according to claim 1, wherein the guide device (10) further includes as one of the individual parts a compensation sleeve (30) with a diameter adapted to fit within the second cylindrical section (42).

29. The bridge cap (70) according to claim 17, wherein the upper edge (41) of the compensation sleeve (30) lies in a plane perpendicularly or obliquely relative to a longitudinal centerline wherein the fastening unit (1) is installed in a bridge cap (70) and oriented in a direction of a surface normal or inclined at a defined angle of at least 10° relative to the surface normal.

30. A fastening unit (1) for fastening a bridge cap to a bridge (90), comprising:
- a fastener (80); and
- a guide device (10) including a cylindrical anchor sleeve (50) and a separate transition piece (40) connected to the anchor sleeve (50), the transition piece (40) having a first cylindrical section (44) configured to receive a diameter of the anchor sleeve (50) and a second cylindrical section (42) oriented away from the first cylindrical section (44), wherein the second cylindrical section (42) is disposed toward an outside (74) of the bridge cap (70).

31. The bridge cap (70) according to claim 30, wherein the fastener (80) is a screw.

\* \* \* \* \*